(12) United States Patent
Henty

(10) Patent No.: US 7,916,460 B2
(45) Date of Patent: Mar. 29, 2011

(54) ERGONOMIC LAY FLAT FOLDING REMOTE CONTROL WITH KEYBOARD

(75) Inventor: David L. Henty, Newport Beach, CA (US)

(73) Assignee: I-Interactive LLC, Irvine, CA (US)

( * ) Notice: Subject to any disclaimer, the term of this patent is extended or adjusted under 35 U.S.C. 154(b) by 352 days.

(21) Appl. No.: 12/075,694

(22) Filed: Mar. 13, 2008

(65) Prior Publication Data

US 2008/0239168 A1    Oct. 2, 2008

Related U.S. Application Data

(60) Provisional application No. 60/918,491, filed on Mar. 16, 2007.

(51) Int. Cl.
G06F 1/16 (2006.01)
G09G 5/00 (2006.01)
H03K 17/94 (2006.01)

(52) U.S. Cl. ......... 361/679.15; 361/679.16; 361/679.56; 345/169; 345/168; 341/22

(58) Field of Classification Search ........... 361/679.01–679.45, 679.55–679.59; 345/156, 157, 168, 169, 905; D14/218; 455/575.1, 455/575.3; 341/22
See application file for complete search history.

(56) References Cited

U.S. PATENT DOCUMENTS

| | | | | |
|---|---|---|---|---|
| 5,151,873 | A | * | 9/1992 | Hirsh .............................. 708/172 |
| 6,094,156 | A | * | 7/2000 | Henty ............................ 341/176 |
| 6,573,854 | B1 | | 6/2003 | Hug et al. |
| D528,103 | S | * | 9/2006 | Mabry et al. ................. D14/218 |
| 7,123,242 | B1 | | 10/2006 | Henty |
| 2003/0227406 | A1 | | 12/2003 | Armstrong |
| 2005/0104742 | A1 | | 5/2005 | Phifer |

* cited by examiner

*Primary Examiner* — Zachary M Pape
*Assistant Examiner* — Nidhi Desai

(57) ABSTRACT

An ergonomic folding remote control with keyboard is disclosed. The folding remote control with keyboard has an ergonomic angled typing surface and thicker forward section along with a lay flat design. The remote controller may be conveniently held in one hand of a user when in the folded or closed position and conveniently rested on a support surface when in the opened position and used as a keyboard.

19 Claims, 9 Drawing Sheets

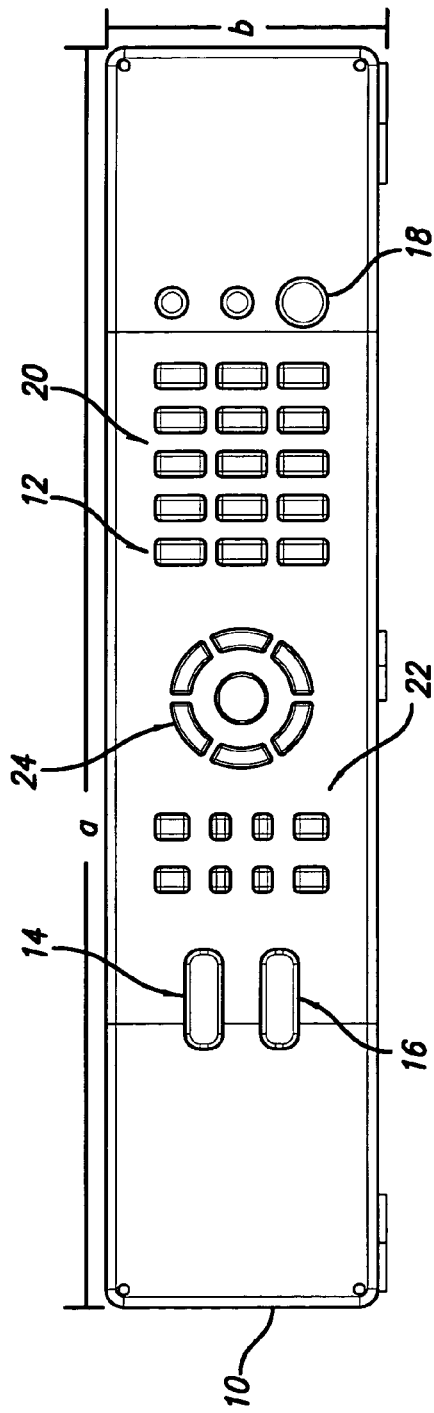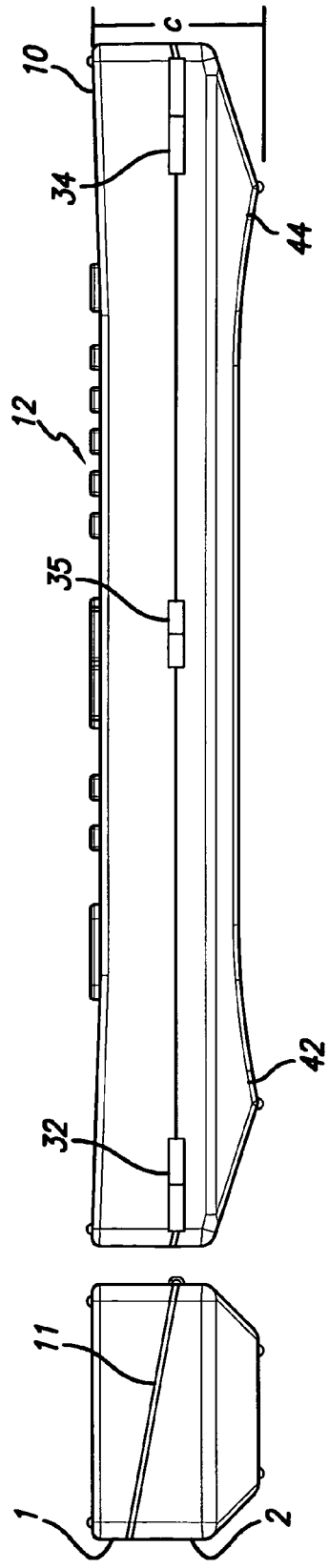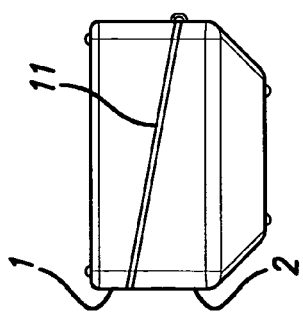

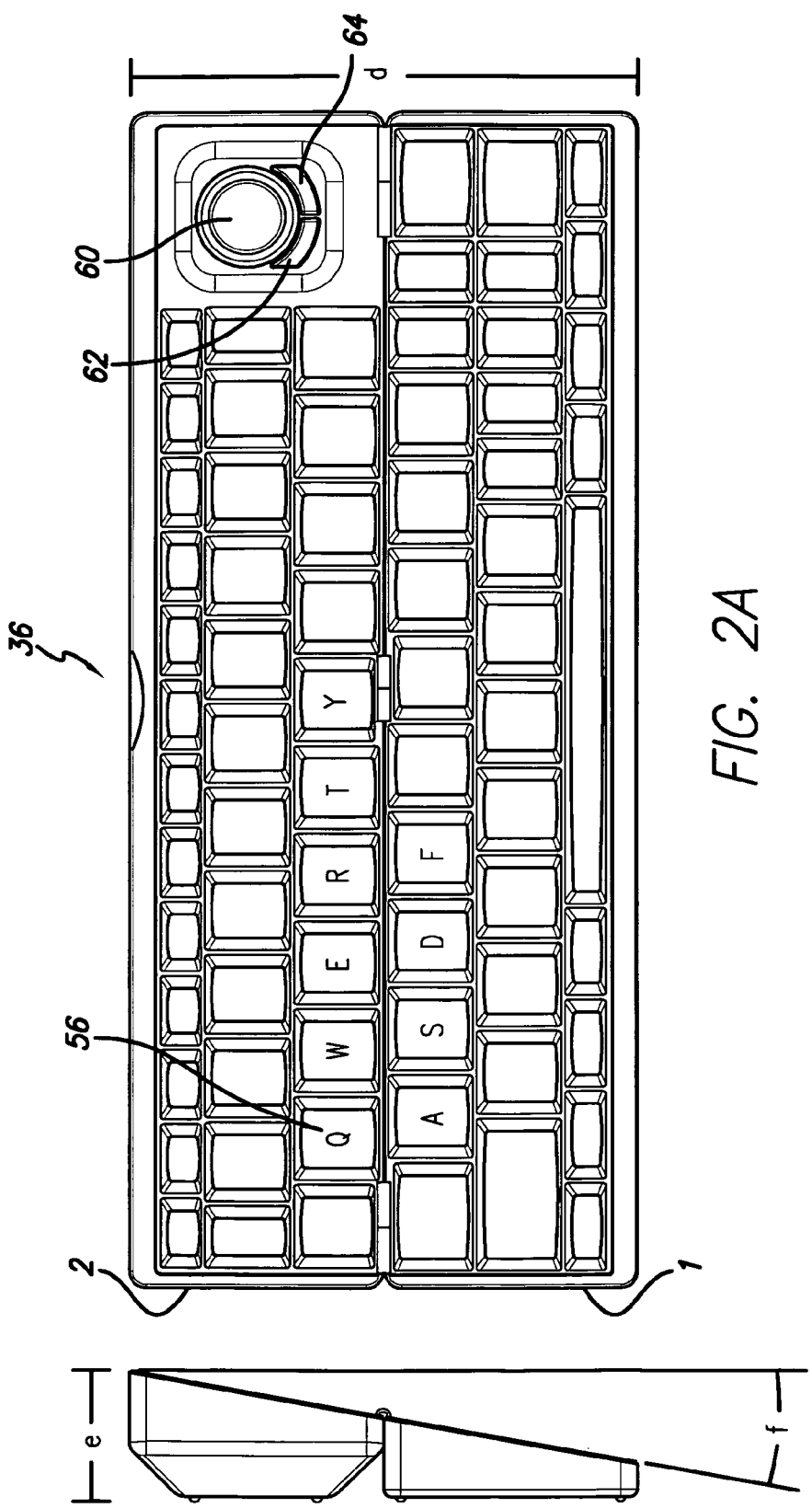

ERGONOMIC LAY FLAT FOLDING REMOTE CONTROL WITH KEYBOARD

RELATED APPLICATION INFORMATION

The present application claims priority to provisional application Ser. No. 60/918,491 filed Mar. 16, 2007, the disclosure of which is incorporated herein by reference in its entirety.

BACKGROUND OF THE INVENTION

1. Field of the Invention

The present invention relates to remote control systems for controlling entertainment systems, such as multimedia systems, Internet access systems and browsers, and related methods.

2. Description of the Prior Art and Related Information

Remote control systems are ubiquitous in entertainment systems and multimedia systems of a wide variety, including TVs, game systems, VCRs and many other well-known entertainment devices. At the same time, the need has arisen for providing computer related control capabilities in the living room along with the control of the more conventional entertainment devices typically present in the living room. For example, combined PC and TV systems have been introduced which integrate the capabilities of the personal computer with the television. Also, set top Internet access devices have been introduced which integrate Internet access capabilities with conventional televisions. The ability to provide full control of a PC or an Internet browser typically requires the use of a keyboard as well as a mouse. A conventional remote control is therefore inadequate for control of such combined entertainment systems.

Wireless keyboards have been introduced to meet this need which allow the user of a combined PC and TV system or a user of a TV Internet access device to control such systems more conveniently. Such wireless keyboards may often include an integrated mouse or other pointing device to provide full control of the PC or Internet functions. Also, wireless keyboards specifically designed for combined PC and TV or TV and Internet device control have been designed with function keys which may be used for control of the TV to provide complete control in a single remote device.

Although such wireless keyboard control devices can provide full control capabilities the wireless keyboards are typically similar in size to a conventional keyboard and are thus somewhat cumbersome for use in living room environment. To substantially reduce the size of the keyboard however, would result in the keys being too small for easy use, particularly in a dimly lit environment such as a living room. Also, the multiple functions provided by such a wireless keyboard adapted for control of both a PC or Internet access device and a TV require a larger keyboard layout. This relatively large size of a wireless keyboard also makes balancing the keyboard on the lap of the user somewhat difficult. Also, such wireless keyboards are somewhat obtrusive when not being used, whether when the TV/PC is not being used or when a TV program or video is being viewed. For this reason, a user of such a combined entertainment system incorporating a TV/PC or TV/Internet device will want to also have a hand held remote control to avoid having to use a cumbersome wireless keyboard at all times. This approach is described in U.S. Pat. No. 5,675,390 which describes the use of two remote controls, one a hand-held remote control and the other a wireless keyboard to control a PC/TV entertainment system. This of course does not solve the problem of the obtrusive nature of the wireless keyboard in the living room during the times when it is not being used.

Accordingly, the addition of PC and/or Internet access capabilities to the conventional TV based entertainment system has introduced the problem of controlling such systems with a convenient yet full function remote control system.

SUMMARY OF THE INVENTION

In a first aspect the present invention provides a remote control, comprising a top section having a top surface with a first set of inputs and a bottom surface, and a bottom section movably coupled to the top section, the bottom section having a top surface and a bottom surface. The top and bottom sections are movable from a first closed configuration, where the bottom surface of the top section and the top surface of the bottom section are adjacent and mate at least along a portion thereof to define an angled cross section relative to a horizontal plane, to a second open configuration adapted to lie flat on a support surface wherein the bottom surface of the top section and the top surface of the bottom section provide an opened surface having a second set of inputs including text entry keys, the opened surface being angled relative to a horizontal plane.

In a preferred embodiment, the top and bottom sections are coupled by one or more hinges along an edge portion and the top section pivots 180 degrees about the hinge in moving from the first to second configuration. The angled cross section is preferably between about 8-13 degrees from horizontal and the angle of the open surface is also between about 8-13 degrees from horizontal. The text entry keys may preferably comprise QWERTY keyboard text entry keys of approximately 19 mm pitch.

In another aspect the present invention provides a remote control, comprising a housing having a top surface with a first plurality of inputs configured in a generally planar portion of the top surface and a bottom surface. one side and movable between a closed configuration with the two sections together and mating along end portions at an angle relative to the generally planar portion of the top surface and an open configuration exposing an inner second plurality of inputs configured on the inner surfaces of the two sections and generally aligned across the two sections. The remote control includes means for ensuring approximately 180 degrees of relative pivoting motion between the top and bottom sections in moving between the open and closed configurations.

For example, the means for ensuring approximately 180 degrees of relative pivoting motion may comprise side portions of the top and bottom sections configured to mate and stop the pivoting at about 180 degrees. The top surface of the housing preferably moves to a configuration in the open configuration which aligns with the bottom surface such that at least portions of the top and bottom sections are configured to engage a flat support surface so as to provide a substantially flat support contact. The top and bottom sections preferably are pivotally coupled at a point halfway between the top and bottom surfaces of the housing.

In another aspect the present invention provides a remote control, comprising a housing having a top section and a bottom section both having a general wedge shape with oppositely oriented thicker and thinner portions so as to mate in a generally rectangular shape. The bottom section has a larger volume than the top section. The top surface of the top section has a first plurality of inputs and the inner surfaces of the top and bottom sections have a second plurality of inputs. The top and bottom sections are pivotally coupled such that the sections are movable from a closed configuration to an open configuration where the second plurality of inputs are exposed.

In a preferred embodiment the bottom section is adapted to receive a battery in a thicker portion of the wedge shape. Also or alternatively the bottom section may include a trackball configured in a thicker portion of said wedge shape.

Further aspects of the invention are disclosed in the following detailed description of the invention.

BRIEF DESCRIPTION OF THE DRAWINGS

FIGS. 1A, 1B, and 1C are top, side and end views of a preferred embodiment of the remote controller of the present invention with the housing in a folded or closed position.

FIGS. 2A and 2B are top and end views respectively of the remote controller of the present invention with the housing in an open configuration.

DETAILED DESCRIPTION OF THE INVENTION

Figure 3:
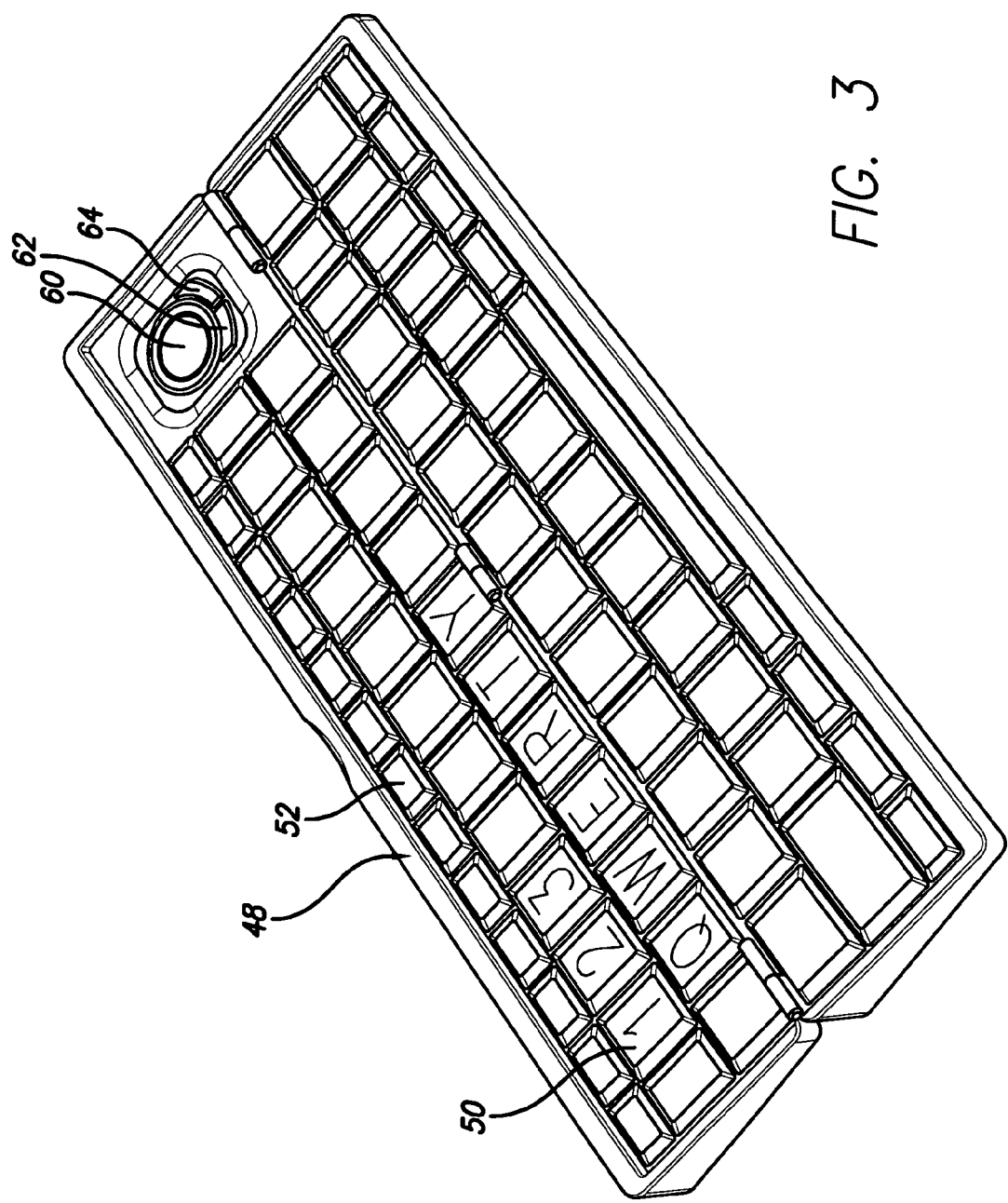
FIGS. 3 and 4 are top perspective views from the front and back, respectively, of the remote controller of the present invention with the housing in an open configuration.

U.S. Pat. Nos. 6,094,156 ('156 patent) and 7,123,242 ('242 patent) are incorporated herein by reference in their entirety as well as that of the above noted '390 patent.

The present invention provides a folding remote control with an inner keyboard having an ergonomic angled typing surface. In particular a deeper (i.e. thicker) dimensioned portion closer to the TV screen when the remote is opened is provided to give an ergonomic angled typing surface typical of conventional desktop QWERTY keyboards. Also, such a configuration is desirable in that it provides additional room to accommodate batteries and/or a trackball or other pointing device requiring additional depth. A lay flat configuration is also provided that it gives a solid feel to the keyboard during text entry.

In FIGS. 1-7 the present invention is illustrated in various perspective, top, end and side views in a presently preferred embodiment. The present invention provides a remote control system adapted for use with an entertainment system requiring keyboard control as well as conventional TV type controls. Such systems are known and will not be described in detail herein. For example, such a system is disclosed in the above noted '390 patent, the disclosure of which is incorporated by reference. The present invention also incorporates many aspects of the above noted '156 and '242 patents which need not be repeated herein as the teachings are expressly incorporated herein by reference.

The remote control system of the present invention is configured in a housing 10 which is adapted to be opened and closed in a folding manner, preferably along one edge of the housing. FIGS. 1A, 1B, and 1C show the housing in a closed configuration whereas FIGS. 2A and 2B show the housing in an open configuration. FIGS. 3-6 in turn show perspective views of open and closed configurations. The housing has a generally rectangular configuration viewed from above with a length "a", a width "b" when closed and a width "d" when open. The housing further has a depth "c" when closed. The length, depth "c" and width "b" are preferably selected so as to allow the remote control to be held comfortably in one hand when the housing is closed. Also, the dimensions are preferably selected to allow the provision of a full pitch keyboard when the housing is in the open configuration. Therefore, to provide a convenient size to be hand-held while closed and provide a keyboard when opened, the dimensions of the housing are preferably in the range indicted in Table 1 below. This provides a width approximately that commonly found in conventional remote controls and provides a comfortable width to hold in one hand while providing an open configuration which easily accommodates the major keys in a full pitch (19 mm) QWERTY keyboard layout. The remote may be adapted to provide a full computer keyboard functionality and include a trackball type controller as shown, in which case a dimension "a" in the higher range may be preferred or the keyboard may have a more limited set of keys and no trackball, and in the latter case a dimension "a" in the lower range may be preferred. The section 11 through the remote housing is angled as shown and the remote when opened has a typing surface with an ergonomic angle for typing with an upward angle toward the TV and also a lay flat bottom surface for a more stable typing feel. Specifically, the angled surface when open provides a maximum height "e" and as shown the section 11 thus extends from a midpoint at height 0.5 c to "e". The angle "f" of the section is chosen to provide a desired typing surface angle and also sufficient room in the top section for dual circuit boards and associated keys and buttons, as shown schematically in FIG. 7.

TABLE 1

| |
|---|
| a = 15-25.5 cm |
| b = 5.0-6.5 cm |
| c = 2.5-3.75 cm |
| d = 10-13 cm |
| e = 1.9-2.9 cm |
| f = 8-13 degrees |

Referring to FIG. 1A, the top surface of the housing 10 includes a number of remote control inputs indicated generally at 12. This first set of control inputs 12 may correspond to conventional remote control functions typically found in hand-held TV remote controls or universal remote controls adapted to control multiple entertainment devices such as TVs, cable or satellite set top boxes, DVRs, VCRs, CD players, DVD players, etc. Therefore the first set of remote control inputs include the volume up and down set of controls 14, a channel up and down set of controls 16, a power button 18 and a set of numeric inputs 20. Also, a number of programmable or special purpose control buttons may be provided these are indicated generally as buttons 22. Also inputs adapted for game control may be provided as part of the first set of inputs 12, examples of which are disclosed in the above noted '390 patent incorporated by reference. Optionally, a microphone may be provided (as described in the above noted patents and incorporated herein by reference) which may provide a telephone or videophone functionality or which may be used for voice recognition control of the system. Also, a multi-directional controller 24 is preferably provided. The multi-directional controller 24 is illustrated as a up, down, left, right type controller typically found controlling menu type functions, for example, in cable or satellite broadcast television systems.

The multi-directional controller 24 may also be a trackball which may provide mouse type control. As will be discussed below, such mouse type controllers may require careful consideration in for depth requirements to not impact on the space available on the inside portion of the controller for the keyboard controls. Alternatively, multi-directional controller 24 may be any of variety of other well-known controller types such as a force sensitive controller or a glide pad controller of the type commonly employed in notebook computers. The first set of controls 12 activate a first wireless transmitter 30 which may preferably be an LED or RF transmitter configured at one end of the housing 10.

Referring to FIGS. 1B and 1C, side and end views of the remote control are illustrated. In these respective views the division of the housing into two sections 1 and 2 which may be opened and closed in a folding manner about hinges 32 and 34 is clearly shown (and additionally one or more hinges 35 may be provided depending on the remote length "a"). A first side of the bottom section 2, corresponding to the front of the keyboard when the housing is an opened configuration, includes a second wireless transmitter 36 which also is preferably a wireless RF or LED transmitter (FIG. 2A). Various latching approaches may be employed including mechanical or magnetic latches. If a mechanical latch is employed bottom section 2 also includes a catch release which releases the top section 1 to be opened. A sensor in the latch or hinge also deactivates the first wireless transmitter 30 and activates the second wireless transmitter 36. The bottom section 2 also accommodates batteries indicated by dashed lines 40 (shown in FIG. 7) which may, for example, be two or more AA type batteries. The shape of the bottom section 2 is illustrated having a varying thickness for a more ergonomic feel with thickened end portions 42, 44 and a thinner tapered middle portion 46 having a length sufficient to accommodate the width of a users hand. For example, the length of the thinner portion may be about four inches with the overall thickness of the housing 10 in this region being about 1.5 inches or less to allow the comfortable holding of the housing in the closed position in one hand of the user in this region. Alternatively, as in the views of FIGS. 6A and 6B, a more even bottom section may also be employed. The tapered bottom section 2 not only provides additional space in the end portions 42,44 for the batteries, but also provides a curved lower surface which may comfortably sit on one leg of a user or on one arm of a sofa or chair of a type typically found in a living room. Also, to avoid the remote keys 12 rubbing against the support surface when the remote is open, the top surface may curve slightly upward adjacent the ends as best shown in FIG. 1B to allow the keys 12 to be below the plane of the contact points. As best shown in FIG. 1C the sides of the top and bottom sections may preferably have a matching flat surface on either side of the hinge which causes a stop to pivoting of the top section at 180 degrees and preserves the angle of the inner surface as shown in FIG. 2B. This flat portion is shown as vertical in FIG. 1C but need not be and the angled portion for an ergonomic grip may extend up past the hinge. Also the lower grip portion may be curved with a flat angled portion provided on either side of the hinge to enforce the 180 degree pivot. Other means for enforcing the 180 degree motion may also be provided, however, such as a stop in the hinge mechanism.

Figure 4:
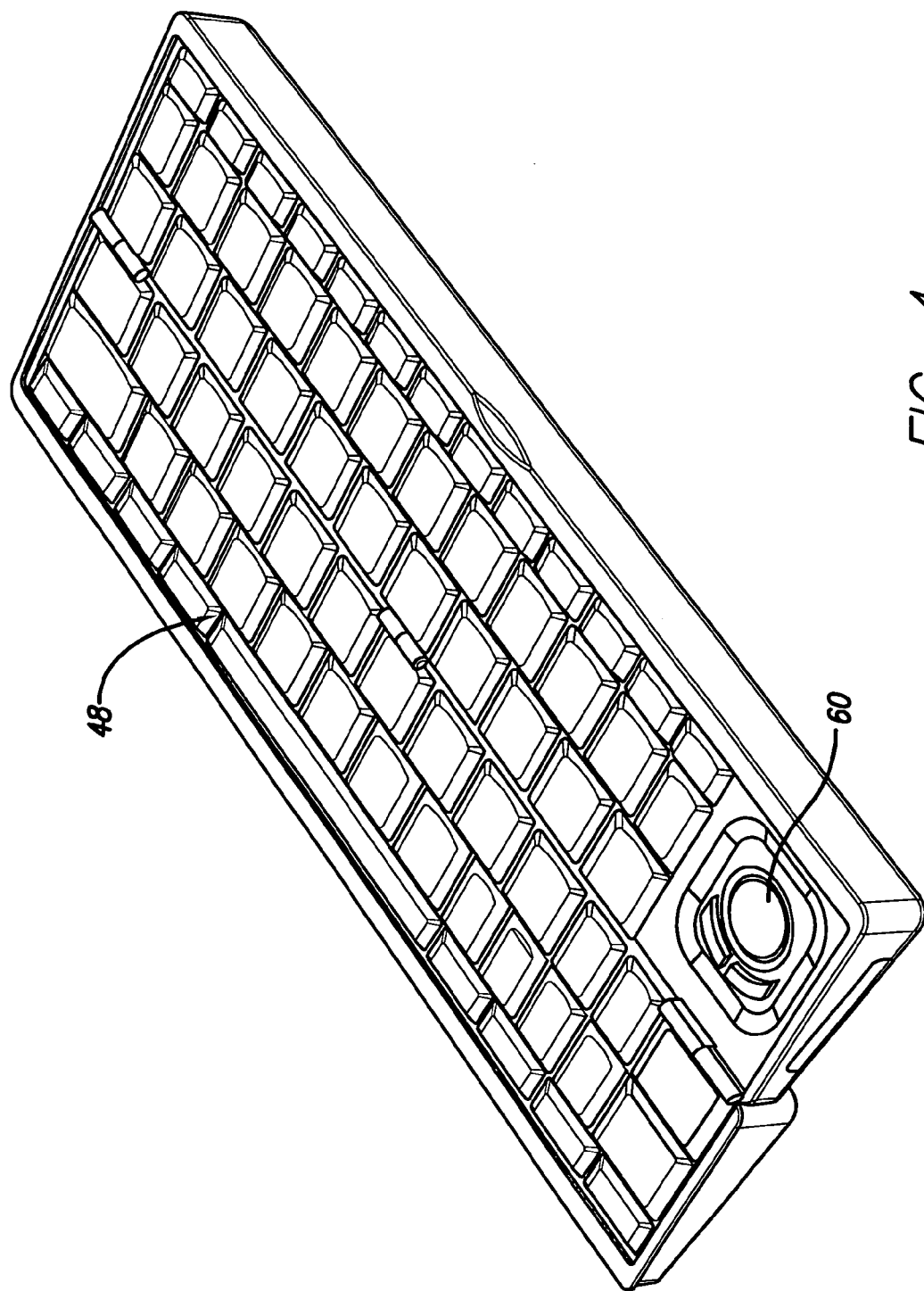
Figure 5:
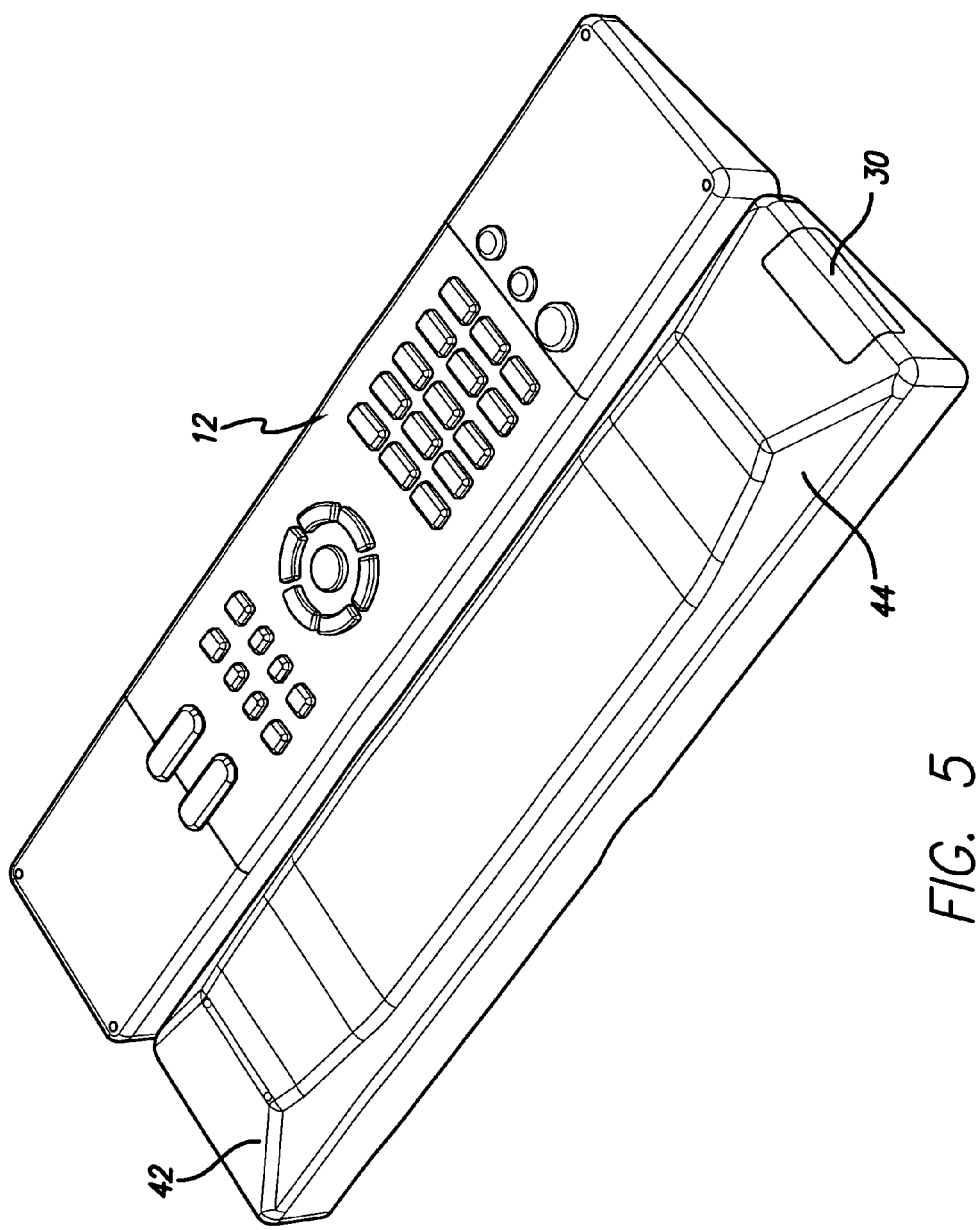
FIG. 5 is a bottom perspective view of the remote controller of the present invention with the housing in an open configuration.
Figure 6A:
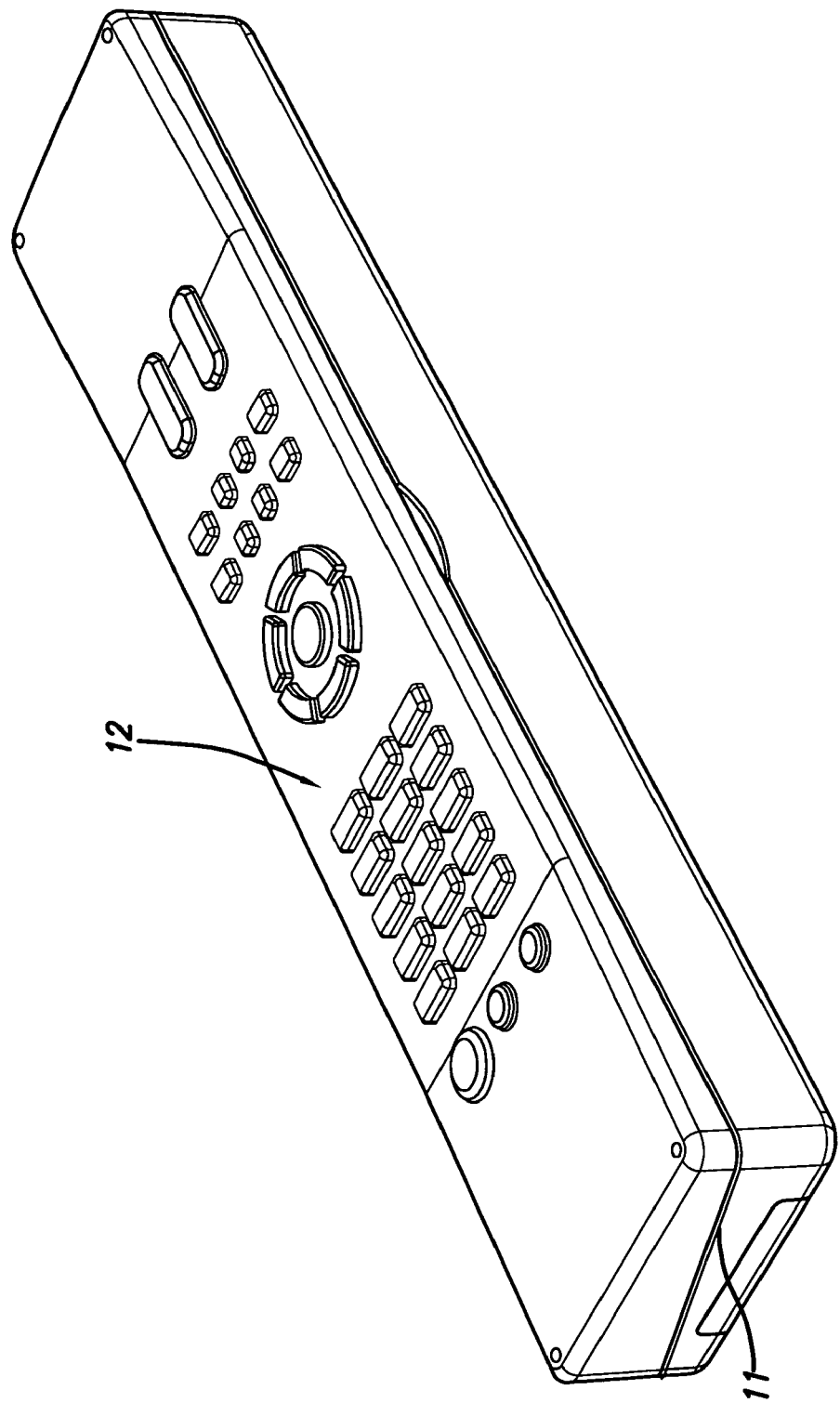
FIGS. 6A and 6B are top perspective views of the remote controller in a closed position, viewed from the front and back respectively.
Figure 6B:
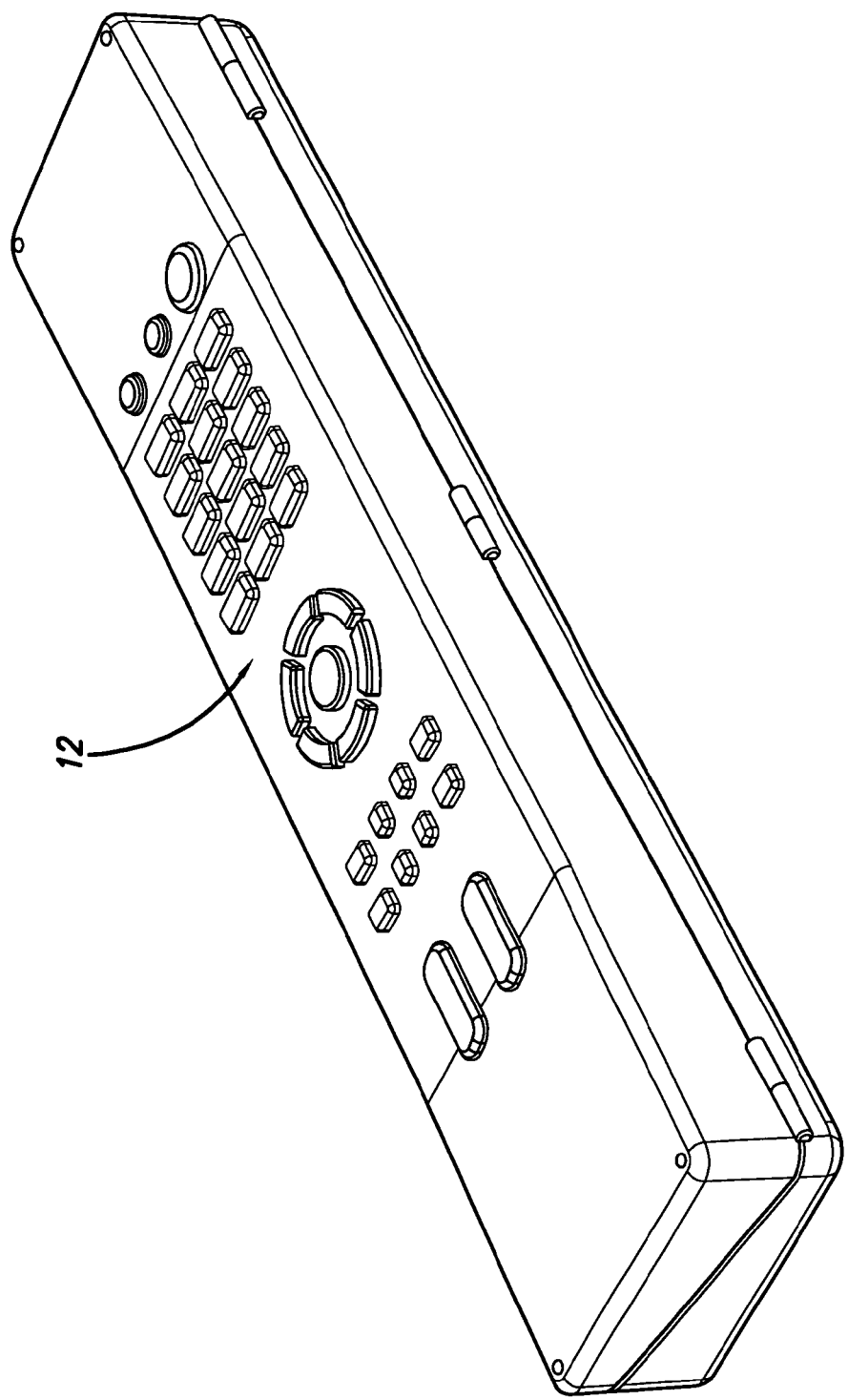

Referring to FIGS. 2A, 3, and 4 the layout of the keyboard remote controller on the inside surfaces of the first section 1 and second section 2 is shown with the housing in an opened configuration exposing a second set of remote control inputs 48. As shown, the housing in an opened configuration provides a width "d"=2 "b" which can accommodate the main keys of a full function keyboard in a relatively uncrowded layout. More specifically, the layout includes a conventional full pitch (19 mm) QWERTY set of text keys 56 split on the two sections 1,2 of the two-piece housing. Also a full set of 10 numeric keys 50 are provided along with a set of function keys 52 and conventional standardized keys such as shift, ctrl, alt, etc. In an application where less than a full set of keyboard keys is desired, however, for example, an application where only text and number entry is needed such as for searching and/or email, a reduced key layout may be employed. For example only four rows of keys can accommodate QWERTY text input and with a fcn key also providing number entry and selected additional key functions. Also, a multi-directional controller 60 is provided to provide mouse control functions and associated left and right mouse type select buttons 62, 64 are also provided as shown. Multi-directional controller 60 may be a trackball, glide pad, force sensitive controller or other multi-directional controller design known in the art. Each type of multi-directional controller may involve different considerations for the space constraints of the remote controller. A trackball type controller occupies less surface area than a glide pad controller but requires additional depth. Therefore, the different types of controllers may be characterized as three-dimensional in nature, for example, trackball and typical force sensitive controllers, and two-dimensional such as glide pads. The present invention allows three-dimensional multi-directional controllers to be more readily accommodated by providing a thicker lower section 2 due to the angled section 11. Also such controllers may be configured over the thickened portions 42, or 44, of the bottom section 2 of the remote controller. As discussed below and using the teachings of the above noted patents, in an alternate embodiment two-dimensional controllers may also be accommodated without sacrificing area of the inside surface devoted to the alphanumeric keyboard layout by a slide out configuration from the lower section 2. Also inputs adapted for game control may be provided on the inner surfaces as part of the second set of inputs 48, examples of which are disclosed in the above noted '390 patent incorporated by reference.

Figure 7:
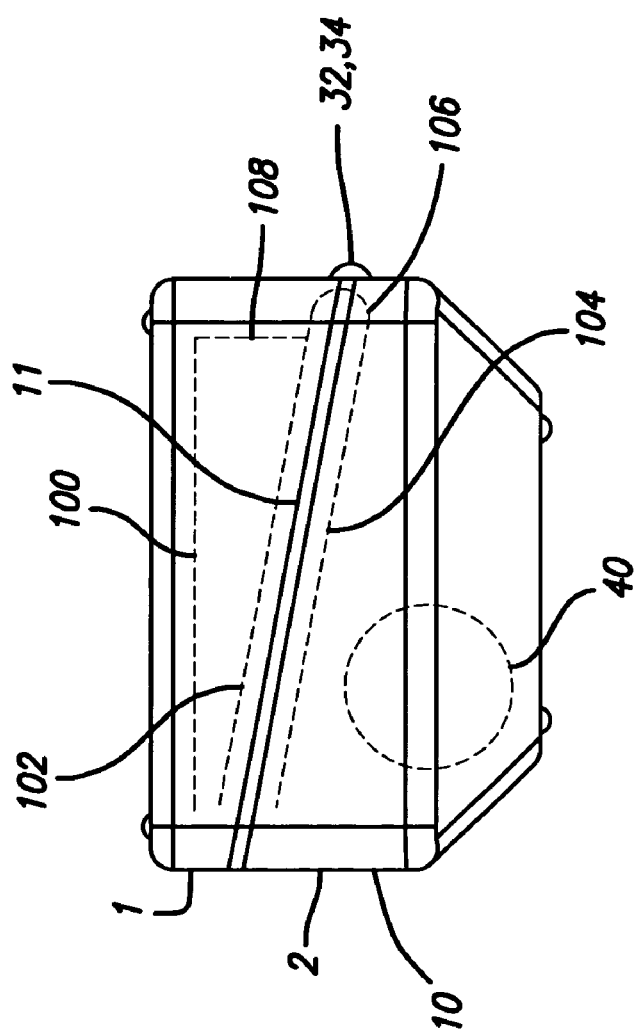
FIG. 7 is an end view of the remote controller of the present invention in a closed configuration illustrating internal circuit board and battery configurations.

The circuitry of the remote controller may correspond to that described in the above noted patents incorporated herein by reference and is not described in detail herein. As described therein, the first transmitter 30 is connected to a first set of remote control circuitry and the second transmitter 36 is connected to a second set of remote control circuitry which circuitry is respectively activated by the corresponding outer 12 and inner 48 sets of remote controls. If a universal control is desired the first transmitter may be IR while the second transmitter may preferably be RF if a trackball 60 is provided. Alternatively two IR transmitters may be used or a single RF transmitter. If an RF transmitter is employed the RF transmission may employ Bluetooth or other standardized protocol or a custom frequency and protocol may be used. Also in some applications, such as game controllers, a wired transmission may be preferred. As shown in FIG. 7, top section 1 may incorporate the circuitry on two circuit boards 100, 102 configured at an angle to match the surfaces with the corresponding inputs 12, 48. The bottom section 2 in turn may have a single circuit board 104 and circuit boards 102, 104 are coupled via a flex circuit 106 through the hinges 32, 34. Also, circuit boards 100 and 102 are preferably coupled via a second flex circuit 108 to share a processor/controller or to share a transmitter.

As in the above noted '156 and '242 patents in alternate embodiments of the remote controller a glide pad may be employed as the multi-directional controller configured as the track ball illustrated or a pullout multi-directional controller in the thicker section may be employed, and such are equally disclosed herein by incorporation. It will of course be appreciated that other types of controllers may be employed in place of glide pad or track ball, for example, a force sensitive controller may also be employed. It will be appreciated that all such embodiments are implied herein.

Figure 8:
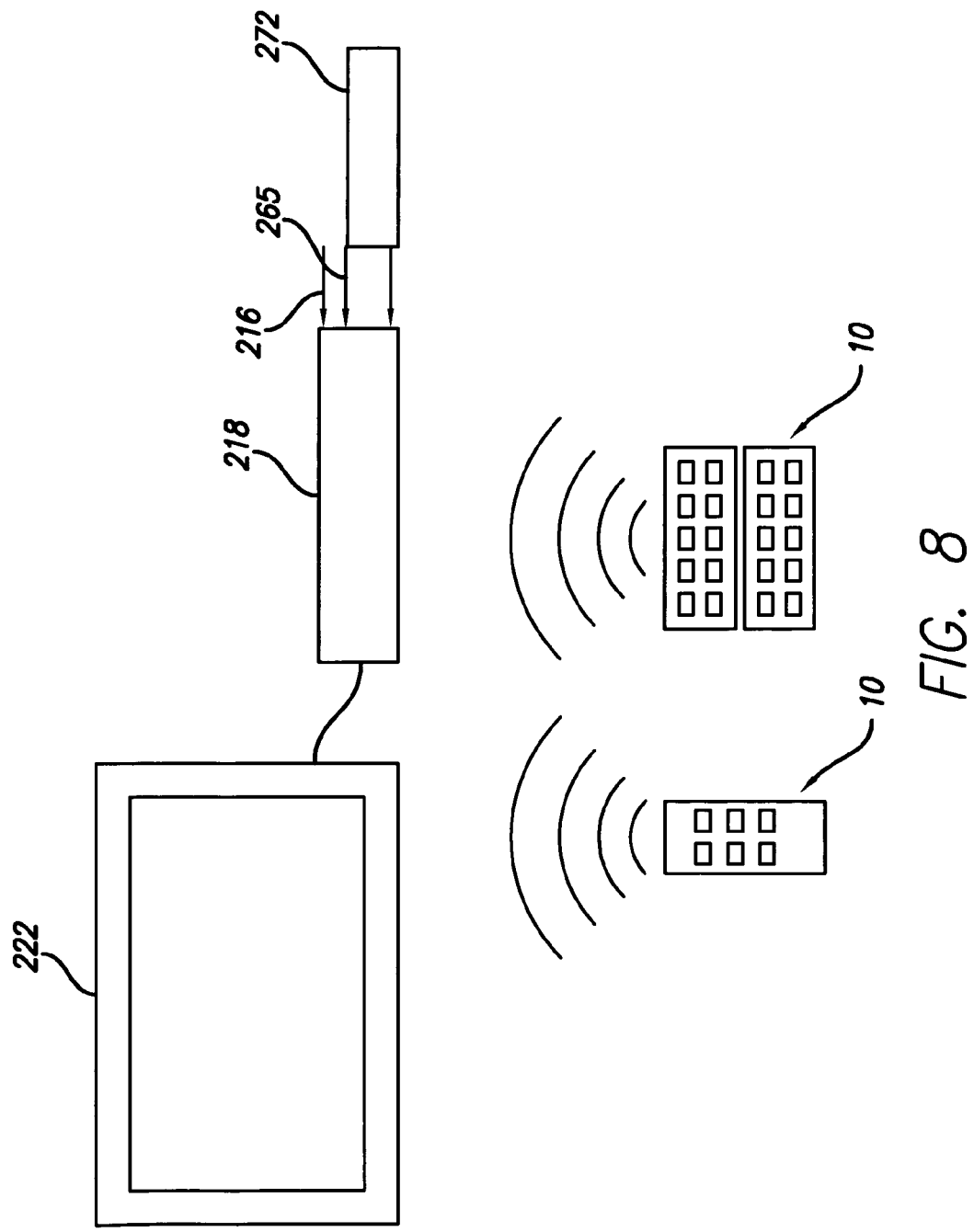
FIG. 8 is a schematic drawing of an improved entertainment system in accordance with the present invention.

Referring to FIG. 8 an improved entertainment system in accordance with the present invention is illustrated. As shown, the entertainment system includes a TV monitor 222 which is coupled to a data processing device 218 of the type which receives text input control signals, such as a PC or internet access device. Also, additional devices or inputs may be provided to the entertainment system, e.g., a DVR 272, wired or wireless networked device coupled to a PC or other media server and other video and data inputs indicated generally by inputs 216 and 265 in FIG. 8. Also shown is remote 10, illustrated in both the first (open) and second (closed) configurations as described above. Remote 10 provides typical TV type control signals to the entertainment system in the second (closed) position, such as volume up/down and power, and text input control signals in the first (open) position.

The present invention may also be employed a compact internet access device and may incorporate a microphone, speaker and provide a videophone or VoIP capability as described in the above noted patents incorporated herein by reference. Also the present invention may be employed in applications such as transportation where a wired rather than wireless remote is preferred, such as airline or automobile video interactive entertainment systems.

It will be appreciated by those skilled in the art that the foregoing is merely an illustration of the present invention in currently preferred implementations. A wide variety modifications to the illustrated embodiments are possible while remaining within the scope of the present convention. Therefore, the above description should not be viewed as limiting but merely exemplary in nature.

What is claimed is:

1. A remote control, comprising:
   a top section having a top surface with a first set of inputs and a bottom surface;
   a bottom section movably coupled to the top section, the bottom section having a top surface and a bottom surface;
   wherein the top and bottom sections are movable from a first closed configuration, where the bottom surface of the top section and the top surface of the bottom section are adjacent and mate at least along a portion thereof to define an angled cross section relative to a horizontal plane, to a second open configuration adapted to lie flat on a support surface wherein the bottom surface of the top section and the top surface of the bottom section provide an opened surface having a second set of inputs including text entry keys, the opened surface being angled relative to a horizontal plane.

2. A remote control as set out in claim 1, wherein the top and bottom sections are coupled by one or more hinges along an edge portion and wherein the top section pivots 180 degrees about the hinge in moving from said first to second configuration.

3. A remote control as set out in claim 1, wherein the angled cross section is between about 8-13 degrees from horizontal.

4. A remote control as set out in claim 3, wherein the angle of the open surface is between about 8-13 degrees from horizontal.

5. A remote control as set out in claim 1, wherein said text entry keys are configured on both the bottom surface of the top section and the top surface of the bottom section.

6. A remote control as set out in claim 1, wherein said first set of inputs comprise one or more of TV, game or other entertainment device control inputs.

7. A remote control as set out in claim 5, wherein said text entry keys comprise QWERTY keyboard text entry keys of approximately 19 mm pitch.

8. A remote control as set out in claim 1, wherein the top and bottom sections have substantially flat matching side surfaces along at least a portion of the edge where the sections are coupled which form a substantially flat surface when in the closed configuration and which mate when in the open configuration.

9. A remote control as set out in claim 1, wherein the first and second plurality of inputs are oriented for operation at 90 degree orientations in said closed and opened configurations, respectively.

10. A remote control as set out in claim 1, wherein the top and bottom sections in the closed configuration define a height of the remote and wherein the top section and the bottom section are coupled along one side at a point about one half of said height and mate when closed at the opposite side at a higher point.

11. A remote control as set out in claim 1, wherein the inner surface includes a multi-directional input.

12. A remote control, comprising:
   a housing having a top surface with a first plurality of inputs configured in a generally planar portion of the top surface and a bottom surface, the housing comprising a top section and a bottom section pivotally coupled on one side and movable between a closed configuration with the two sections together and mating along end portions at an angle relative to said generally planar portion of the top surface and an open configuration exposing an inner second plurality of inputs configured on the inner surfaces of the two sections and generally aligned across the two sections, wherein said top surface of the housing moves to a configuration in said open configuration which aligns with the bottom surface such that at least portions of the top and bottom sections are configured to engage a flat support surface so as to provide a substantially flat support contact; and
   means for ensuring approximately 180 degrees of relative pivoting motion between said top and bottom sections in moving between said open and closed configurations.

13. A remote control as set out in claim 12, wherein said means for ensuring approximately 180 degrees of relative pivoting motion comprises side portions of the top and bottom sections configured to mate and stop said pivoting at about 180 degrees.

14. A remote control as set out in claim 12, wherein the top and bottom sections are pivotally coupled at a point halfway between the top and bottom surfaces of the housing.

15. A remote control as set out in claim 12, wherein the angle relative to said generally planar portion of the top surface in said closed configuration is between about 8-13 degrees and wherein said second plurality of keys are aligned at an angle between about 8-13 degrees relative to said generally planar portion of the top surface in said open configuration.

16. A remote control, comprising:
   a housing having a top section and a bottom section both having a general wedge shape when viewed from an end of the remote with oppositely oriented thicker and thinner portions so as to mate in a generally rectangular shape, said bottom section having a larger volume than said top section, the top surface of the top section having a first plurality of inputs and the inner surfaces of the top and bottom sections having a second plurality of inputs, wherein the top and bottom sections are pivotally coupled such that the sections are movable from a closed configuration to an open configuration where said second plurality of inputs are exposed.

17. A remote control as set out in claim 16, wherein said bottom section is adapted to receive a battery in a thicker portion of said wedge shape.

18. A remote control as set out in claim 16, wherein said bottom section includes a trackball configured in a thicker portion of said wedge shape.

19. A remote control as set out in claim 16, wherein in said open configuration the wedge portions of the top and bottom sections together create an angle for said second plurality of inputs relative to a flat support surface of between 8-13 degrees.

* * * * *